United States Patent
Seino et al.

(10) Patent No.: US 6,597,508 B2
(45) Date of Patent: Jul. 22, 2003

(54) OPTICAL TOUCH PANEL HAVING REDUCED NUMBER OF ELEMENTS

(75) Inventors: Takeshi Seino, Akishima (JP); Akihiro Katahira, Akishima (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 16 days.

(21) Appl. No.: 09/795,868

(22) Filed: Feb. 28, 2001

(65) Prior Publication Data

US 2002/0118461 A1 Aug. 29, 2002

(51) Int. Cl.$^7$ .............................. G02B 27/10; G09G 5/00
(52) U.S. Cl. ........................ 359/618; 359/627; 345/173; 345/175
(58) Field of Search .................................. 359/618, 619, 359/621, 627; 345/173, 175; 250/221

(56) References Cited

U.S. PATENT DOCUMENTS

| | | | |
|---|---|---|---|
| 4,198,623 A | * 4/1980 | Misek et al. ................. | 345/175 |
| 4,737,631 A | * 4/1988 | Sasaki et al. ............... | 250/221 |
| 4,837,430 A | * 6/1989 | Hasegawa ................... | 250/221 |
| 4,933,544 A | * 6/1990 | Tamaru ....................... | 345/175 |
| 6,362,468 B1 | * 3/2002 | Murakami et al. .......... | 250/221 |

FOREIGN PATENT DOCUMENTS

| | | | | |
|---|---|---|---|---|
| JP | 62-62351 | 4/1987 | | |
| JP | 62-88022 | 4/1987 | | |
| JP | 62-088022 | * 4/1987 | ............. | G06F/3/03 |
| JP | 3-25220 | 5/1991 | | |
| JP | 2000-311051 | * 11/2000 | ............. | G06F/3/03 |

* cited by examiner

*Primary Examiner*—Ricky Mack
*Assistant Examiner*—Alicia M Harrington
(74) *Attorney, Agent, or Firm*—Frishauf, Holtz, Goodman & Chick, P.C.

(57) ABSTRACT

An optical touch panel includes a plurality of light-emitting elements, reflectors for reflecting lights from the plurality of light-emitting elements, and a plurality of light-receiving elements for receiving reflected lights from the reflectors. The plurality of light-emitting elements and the plurality of light-receiving elements are arranged alternately along two adjacent sides of a rectangular position-detecting surface, and the reflectors are arranged along the other two adjacent sides of the position-detecting surface, respectively. A drive controller causes the plurality of light-emitting elements to light in a predetermined order to thereby cause ones of the light-receiving elements arranged on opposite sides of each of the plurality of light-emitting elements to receive reflected lights from the reflectors. Hollow cylinders opposed to the respective light-receiving elements inhibit lights other than the reflected lights reflected by the reflectors from being incident on the plurality of light-receiving elements.

5 Claims, 5 Drawing Sheets

OPTICAL TOUCH PANEL HAVING REDUCED NUMBER OF ELEMENTS

BACKGROUND OF THE INVENTION

1. Field of the Invention

This invention relates to an improved optical touch panel.

2. Description of the Prior Art

FIG. 4 shows the construction of a conventional optical touch panel.

The optical touch panel 101 has a plurality of light-emitting elements 110 arranged along two adjacent sides of a rectangular position-detecting surface 150 and a plurality of light-receiving elements 130 arranged along the other two sides of the same such that the light-emitting elements 110 are opposed to the respective light-receiving elements 130 with the position-detecting surface 150 therebetween.

A control block 140 causes the light-emitting elements 110 to light sequentially from left to right and from top to bottom as viewed in FIG. 4, and causes the light-receiving elements 130 to receive lights from the respective light-emitting elements 110 opposed thereto.

In the optical touch panel 101, optical paths are formed on the position-detecting surface 150 in a grid pattern.

When an object 170 lies in a position shown in FIG. 4, the object 170 blocks some optical paths to thereby hinder lights from the corresponding light-emitting elements 110 from reaching light-receiving elements 130 opposed to the light-emitting elements 110. As a result, the control block 140 detects the position (two dimensional coordinates) of the object 170 based on information of received lights from the light-receiving elements 130.

In the above optical touch panel 101, however, it is required to arrange elements 110, 130 along the four sides of the rectangular position-detecting surface 150, and hence it takes a lot of time for establishing wire connections of the elements.

To solve the problem, another optical touch panel constructed as below was proposed.

FIG. 5 shows the construction of this prior art optical touch panel.

The optical touch panel 201 is comprised of light-emitting elements 210, two reflectors 220 for reflecting lights from the light-emitting elements 210, and light-receiving elements 230 for receiving the reflected lights from the reflectors 220.

The light-emitting elements 210 and the light-receiving elements 230 are alternately arranged along two adjacent sides of a rectangular position-detecting surface 250, and the reflectors 220 are arranged along the other two adjacent sides of the rectangular position-detecting surface 250.

When an object 270 lies in a position shown in FIG. 5, the object 270 blocks some optical paths to thereby hinder lights from the reflectors 220 from reaching the light-receiving elements 230 opposed to the object 270. As a result, a control block 240 detects the position of the obstacle 270 based on information of received lights from the light-receiving elements 230.

This optical touch panel makes it possible to simplify wiring, compared with the FIG. 4 conventional touch panel.

However, the FIG. 5 optical touch panel uses a pair of elements (i.e. a light-emitting element 210 and a light-receiving element 230) per one optical path, so that it is required to provide numerous light-emitting and light-receiving elements, which results in an increase in manufacturing costs.

SUMMARY OF THE INVENTION

It is an object of the invention to provide an optical touch panel having a construction which makes it possible to decrease the number of elements, thereby reducing manufacturing costs.

To attain the above object, the present invention provides an optical touch panel including a plurality of light-emitting means, reflector means for reflecting lights from the plurality of light-emitting means, and a plurality of light-receiving means for receiving reflected lights from the reflector means, the plurality of light-emitting means and the plurality of light-receiving means being arranged alternately along two adjacent sides of a rectangular position-detecting surface, the reflector means being arranged along each of other two adjacent sides of the position-detecting surface.

The optical touch panel according to the invention is characterized by comprising:

control means that causes the plurality of light-emitting means to light in a predetermined order to thereby cause ones of the plurality of light-receiving means arranged on opposite sides of each of the plurality of light-emitting means to receive reflected lights from the reflector means; and blocking means that inhibits lights other than the reflected lights reflected by the reflector means from being incident on the plurality of light-receiving means.

According to this optical touch panel, when an object lies on one of two optical paths simultaneously formed in a manner extending from one light-emitting means to corresponding two light-receiving means, i.e. two light-receiving means arranged on respective opposite sides of the one light-emitting means, one of the two light-receiving means on one side of the lit light-emitting means receives a reflected light from the reflector means, whereas the other of the two light-receiving means on the other side does not receive the reflected light. These results are delivered as received-light information from the two light-receiving means to the control means. The control means detects the position of the object based on received-light information delivered from the light-receiving means arranged along the two sides of the position-detecting surface. It should be noted that lights reflected off the object on the position-detecting surface are blocked by the blocking means and inhibited from being incident on the light-receiving means, and therefore it is possible to detect the position of the object without any error.

Preferably, the blocking means is formed by a plurality of hollow cylinders opposed to light-receiving surfaces of the plurality of light-receiving means, respectively.

According to this preferred embodiment, lights from optical paths other than predetermined optical paths are blocked by the peripheral wall of each hollow cylinder and inhibited from being incident on the light-receiving surfaces of the light-receiving means.

Alternatively, the blocking means is formed by plates formed with a plurality of through holes opposed to light-receiving surfaces of respective corresponding ones of the plurality of light-receiving means.

According to this preferred embodiment, lights from optical paths other than predetermined optical paths are blocked by the plates and inhibited from being incident on the light-receiving surfaces of the light-receiving means.

More preferably, the optical touch panel further comprises a plurality of condensing lenses for each condensing a light emitted from a corresponding one of the plurality of light-emitting means such that the condensed light is directed in a predetermined direction.

According to this preferred embodiment, a light emitted from each of the plurality of light-emitting means is condensed such that the condensed light is directed in a predetermined direction and then reflected by the reflector means to be incident on the associated light-receiving means.

The above and other objects, features and advantages of the present invention will become more apparent from the following detailed description taken in conjunction with accompanying drawings.

DETAILED DESCRIPTION OF THE PREFERRED EMBODIMENTS

The invention will now be described in detail with reference to drawings showing preferred embodiments thereof.

Figure 1:
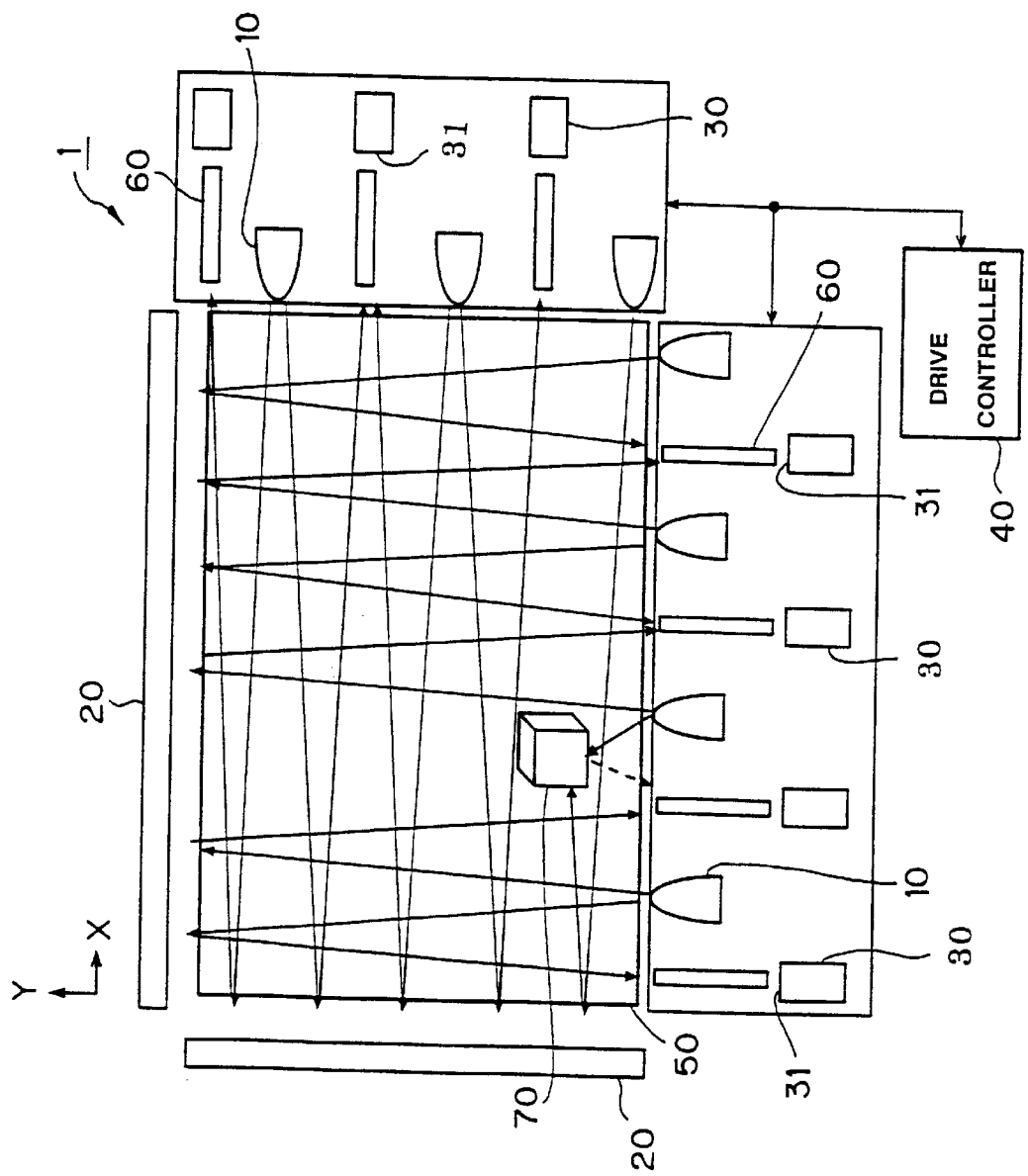
FIG. 1 is a block diagram showing the construction of an optical touch panel according to a first embodiment of the invention.

FIG. 1 shows the construction of an optical touch panel according to a first embodiment of the invention.

The optical touch panel 1 is comprised of light-emitting elements (light-emitting means) 10, reflectors (reflector means) 20, light-receiving elements (light-receiving means) 30, and a drive controller (control means) 40.

The light-emitting elements 10 and the light-receiving elements 30 are arranged alternately along two adjacent sides (in respective X and Y directions) of a frame, not shown, which holds a rectangular position-detecting surface 50.

The light-receiving elements 30 are arranged at locations backward of the light-emitting elements 10, i.e. rightward of the light-emitting elements 10 arranged along the right side of the frame and downward of the light-emitting elements 10 arranged along the lower side of the frame, as viewed in the figure. Hollow cylinders (blocking means) 60 are each arranged such that an end face thereof is opposed to a light-receiving surface 31 of the corresponding light-receiving element 30.

Therefore, lights reflected off an object 70 on the position-detecting surface 50 are blocked by the wall of each hollow cylinder 60, so that the light-receiving elements 30 can receive only lights reflected by the reflectors 20.

The length and inner diameter of each hollow cylinder 60 are set such that the hollow cylinder 60 allows lights reflected by the reflector 20 to be incident on the light-receiving element 30, but blocks lights reflected off the object 70 and lights directly emitted from adjacent light-emitting elements.

Each light-emitting element 10 is comprised e.g. of a light-emitting diode, while each light-receiving element 30 is comprised e.g. of a pin photodiode or a phototransistor.

The light-emitting element 10 includes e.g. an npn transistor and an emitter resistor and is driven by a signal from the drive controller 40.

The light-receiving element 30 receives reflected lights in response to a signal from the drive controller 40.

The light-receiving element 30 includes e.g. a comparator, not shown. A received-light level of a reflected light received by the light-receiving element 30 is compared with a predetermined threshold level by the comparator, and a signal generated by the comparator is delivered to the drive controller 40.

The comparator delivers the signal having a predetermined logical level (e.g. an H level) when the received-light level has reached the threshold level.

The reflectors 20 are arranged along the other two sides of the position-detecting surface 50, respectively. The reflectors 20 are each formed by coating a base plate formed e.g. of ABS resin (acrylonitrile butadiene styrene terpolymer) with multilayer films having high reflectances at respective different wavelengths.

The drive controller 40 delivers signals to the light-emitting elements 10 and the light-receiving elements 30 in response to instructions from a drive interface, not shown, to cause the light-emitting elements 10 to light in a predetermined order (e.g. by lighting one by one in a sequential order or by simultaneously lighting a plurality of alternate ones at each time), and light-receiving elements 30 arranged on the opposite (i.e. both) sides of each of the lit light-emitting elements 10 to receive reflected lights from the corresponding one of the reflectors 20. Then, the drive controller 40 informs the drive interface of the position of the object 70 detected based on the output signals from the comparators of the respective light-receiving elements 30.

The position of the object 70 is detected as X and Y coordinates determined from the positions of light-receiving elements 30 delivering output signals each having an L level.

The construction described above enables the optical touch panel 1 to detect the object 70 on the position-detecting surface 50.

According to the above embodiment, since the optical touch panel 1 is constructed such that light-receiving elements 30 located on the opposite, i.e. both sides of each light-emitting element 10 receive reflected lights, the number of the light-emitting elements 10 and the light-receiving elements 30 can be reduced sharply from the number of those in the prior art, which contributes to reduction of manufacturing costs.

Further, since lights reflected off the object 70 can be blocked by the wall of each hollow cylinder 60, it is possible to prevent erroneous detection from being caused by other lights than the reflected lights from the reflectors 20.

Figure 2:
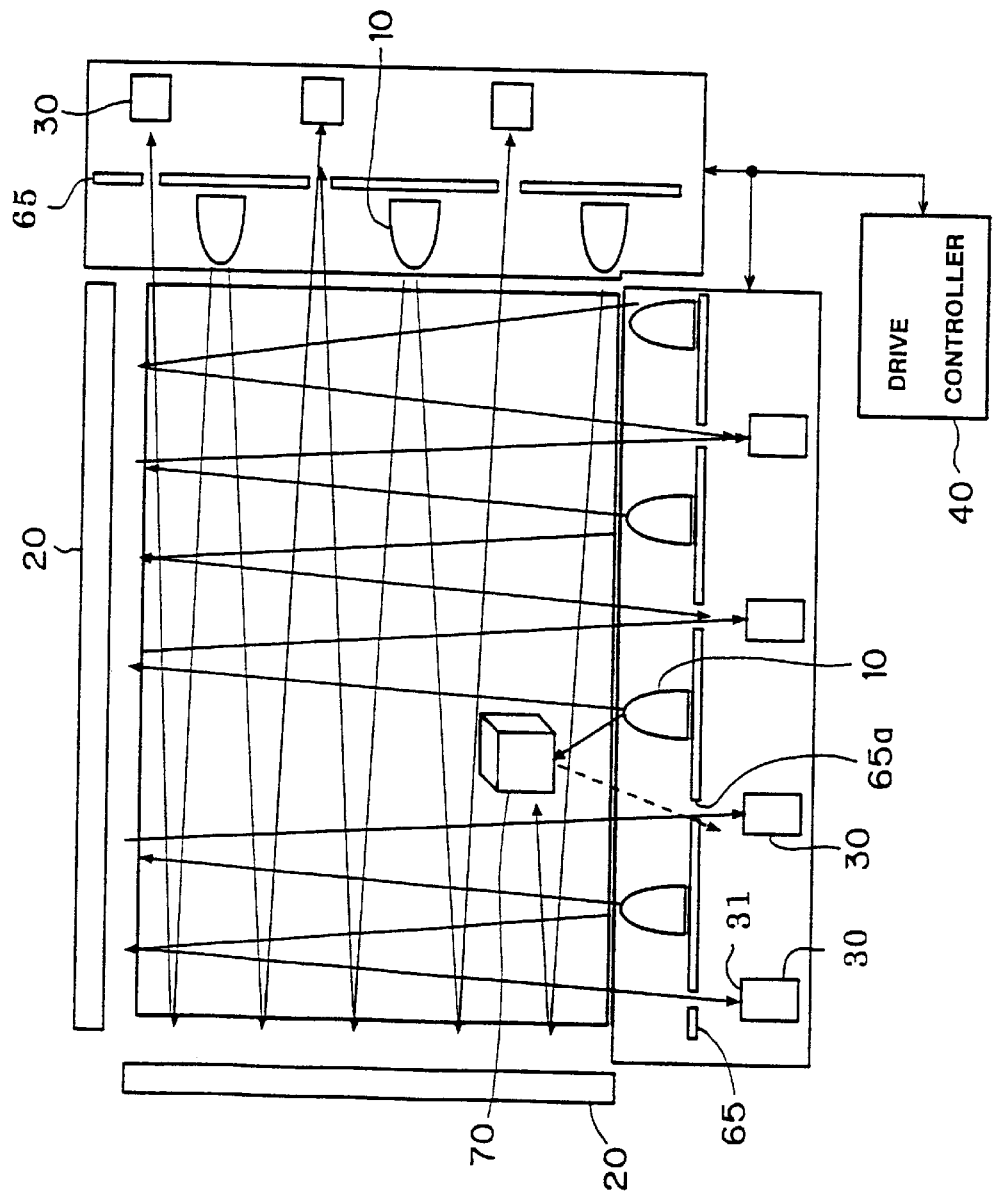
FIG. 2 is a block diagram showing the construction of an optical touch panel according to a second embodiment of the invention.

FIG. 2 shows the construction of an optical touch panel according to a second embodiment of the invention. Component parts and elements corresponding to those of the first embodiment are indicated by identical reference numerals, and description thereof is omitted.

The second embodiment is distinguished from the first embodiment in that plates (blocking means) 65 each formed with through holes 65a each arranged in a manner opposed to a light-receiving surface 31 of a corresponding light-receiving element 30 are used in place of the hollow cylinders 60.

According to the second embodiment, since the construction of the blocking means is simpler than that of the first embodiment, manufacturing of the optical touch panel is facilitated, which makes it possible to produce the optical touch panel at lower costs than that of the first embodiment.

Figure 3:
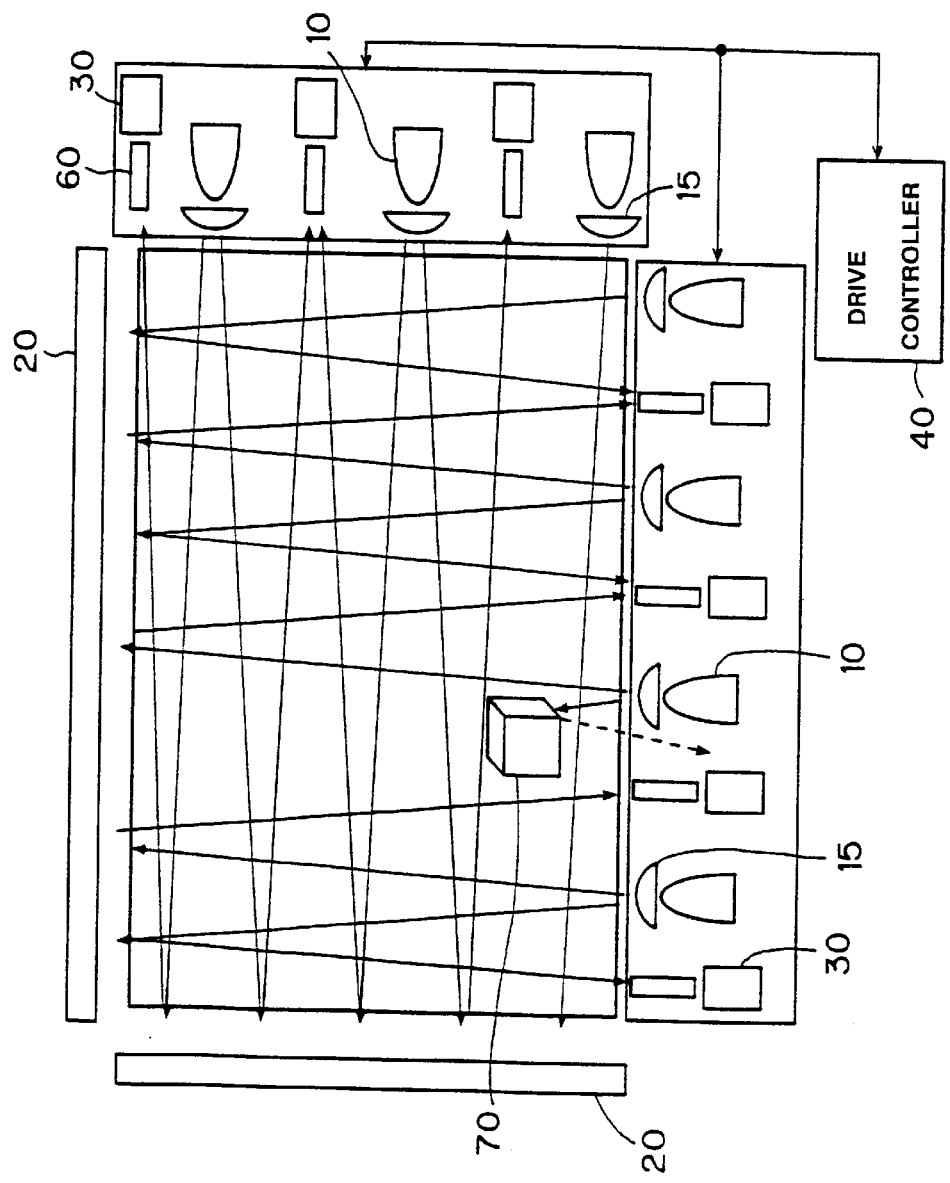
FIG. 3 is a block diagram showing the construction of an optical touch panel according to a third embodiment of the invention.
Figure 4:
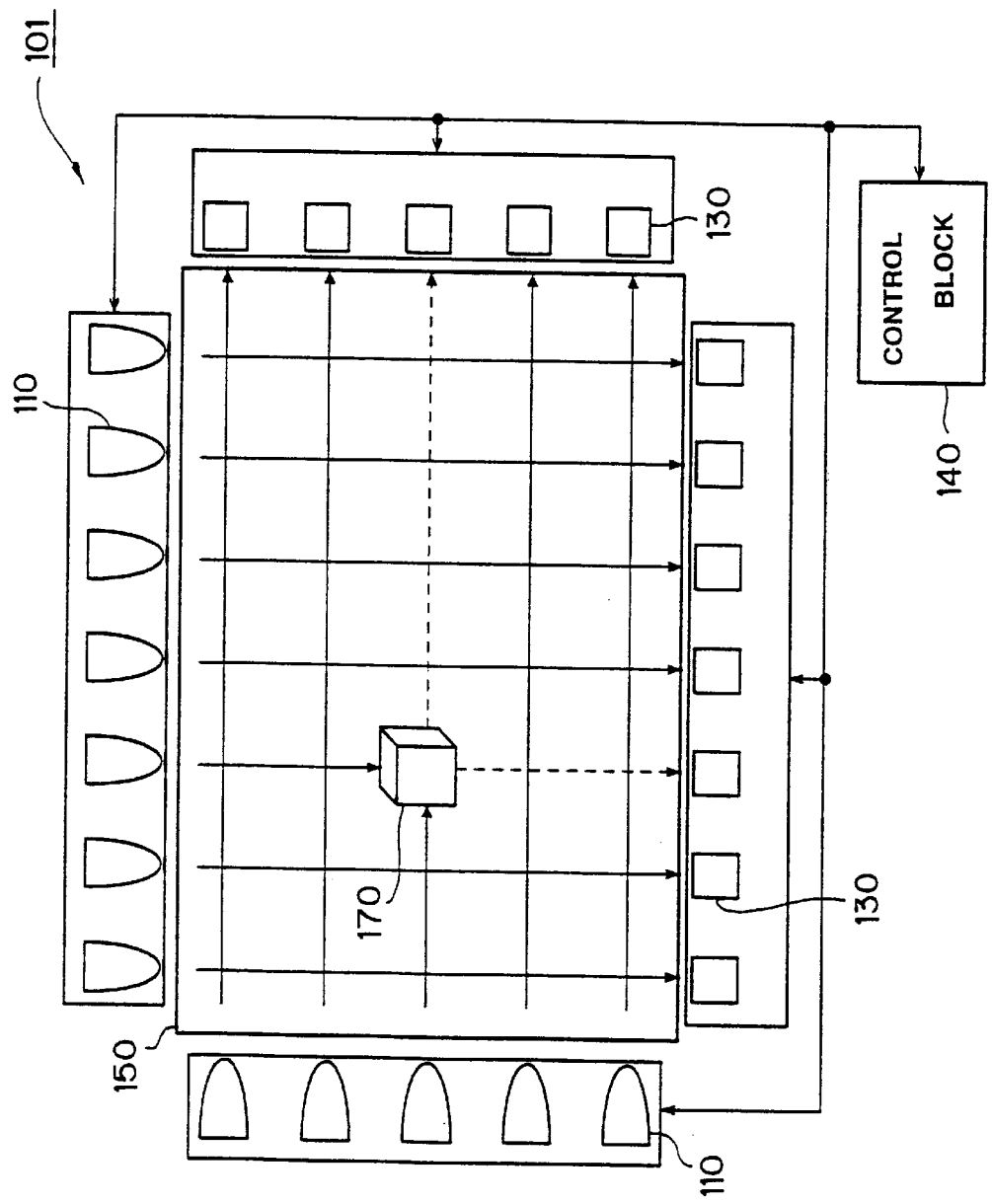
FIG. 4 is a block diagram showing the construction of a conventional optical touch panel.
Figure 5:
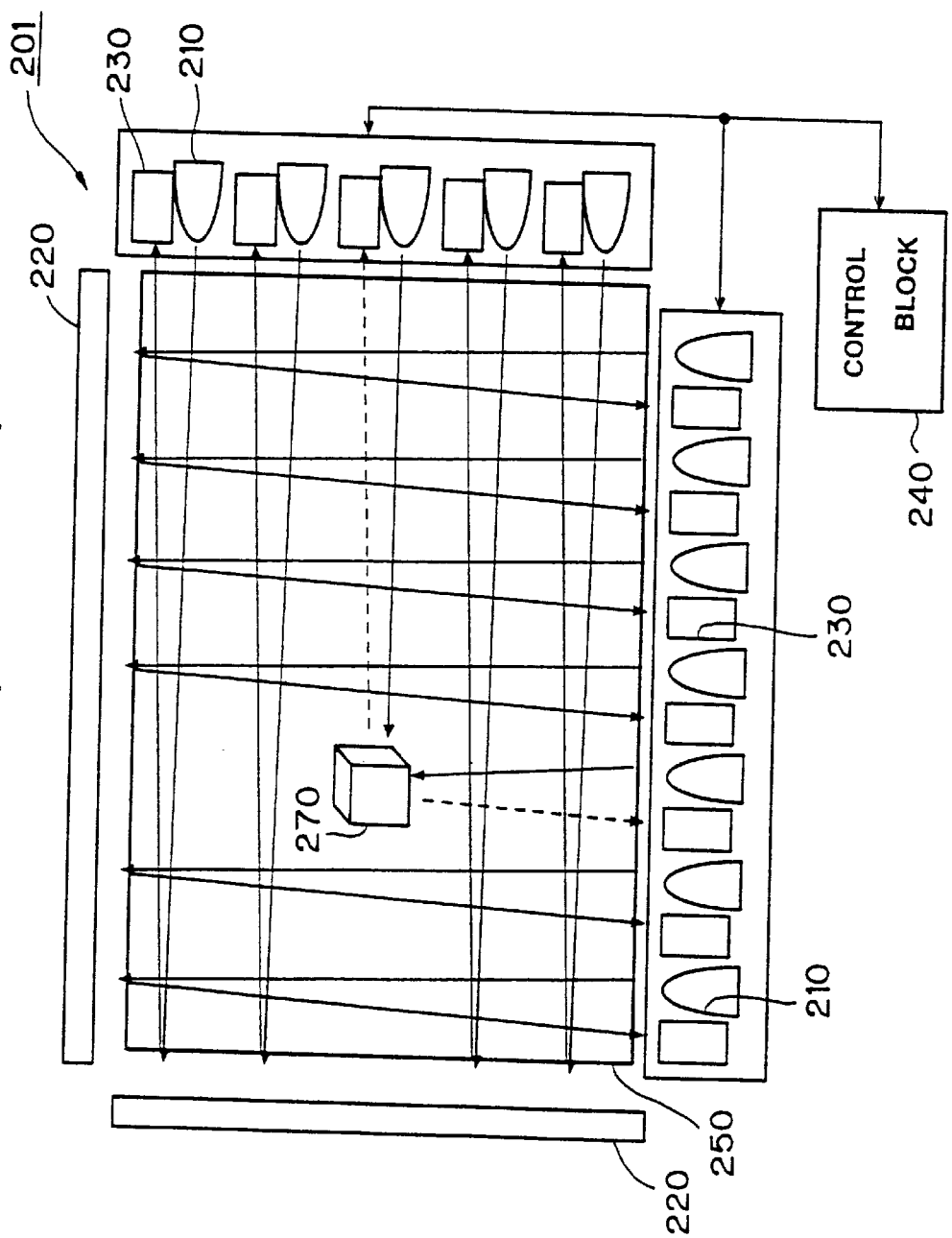
FIG. 5 is a block diagram showing the construction of another conventional optical touch panel

FIG. 3 shows the construction of an optical touch panel according to a third embodiment of the invention. Component parts and elements corresponding to those of the first embodiment shown in FIG. 1 are indicated by identical reference numerals, and description thereof is omitted.

The third embodiment is distinguished from the first embodiment in that condensing lenses 15 are arranged in front of respective light-emitting elements 10 in the direction of light emission. Each condensing lens 15 condenses light emitted from the corresponding light-emitting element 10 such that the condensed light is directed in a predetermined direction.

In this embodiment, since the divergence of light emitted from each light-emitting element 10 is reduced by the condensing lens 15, so that each hollow cylinder 60 is made shorter i.e. smaller in length than that of the first embodiment.

The third embodiment can provide the same effects as obtained by the first embodiment. Further, according to the third embodiment, since each hollow cylinder 60 is shorter as described above, it is possible to make the size of the optical touch panel smaller than that of the optical touch panel of the first embodiment.

Although in the first and third embodiments, the hollow cylinders 60 are formed separately from a frame holding the light-emitting elements 10 and the light-receiving elements 30, this is not limitative but the hollow cylinders 60 may be integrally formed with the frame.

It is further understood by those skilled in the art that the foregoing are preferred embodiments of the invention, and that various changes and modification may be made without departing from the spirit and scope thereof.

What is claimed is:

1. An optical touch panel comprising:

a plurality of light-emitting means for emitting light, reflector means for reflecting the light emitted by said plurality of light-emitting means, a plurality of light-receiving means for receiving the light reflected by said reflector means, said plurality of light-emitting means and said plurality of light-receiving means being arranged alternately along each of first and second adjacent sides of the rectangular position-detecting surface, said reflector means being arranged along each of third and fourth adjacent sides of said position-detecting surface, control means for causing said plurality of light-emitting means to light in a predetermined order to thereby cause respective ones of said plurality of light-receiving means arranged on opposite sides of each of said plurality of light-emitting means to receive the light reflected by said reflector means, and blocking means for inhibiting light other than the light reflected by said reflector means from being incident on said plurality of light-receiving means, wherein said blocking means comprises a plurality of hollow cylinders opposed to light-receiving surfaces of said plurality of light-receiving means, respectively.

2. An optical touch panel according to claim 1, wherein said blocking means comprises plates formed with a plurality of through holes opposed to light-receiving surfaces of respective corresponding ones of said plurality of light-receiving means.

3. An optical touch panel according to claim 1, further comprising a plurality of condensing lenses each for condensing light emitted from a corresponding one of said plurality of light-emitting means such that the condensed light is directed in a predetermined direction.

4. An optical touch panel according to claim 1, further comprising a plurality of condensing lenses each for condensing light emitted from a corresponding one of said plurality of light-emitting means such that the condensed light is directed in a predetermined direction.

5. An optical touch panel according to claim 2, further comprising a plurality of condensing lenses each for condensing light emitted from a corresponding one of said plurality of light-emitting means such that the condensed light is directed in a predetermined direction.

* * * * *